Patented Mar. 27, 1951

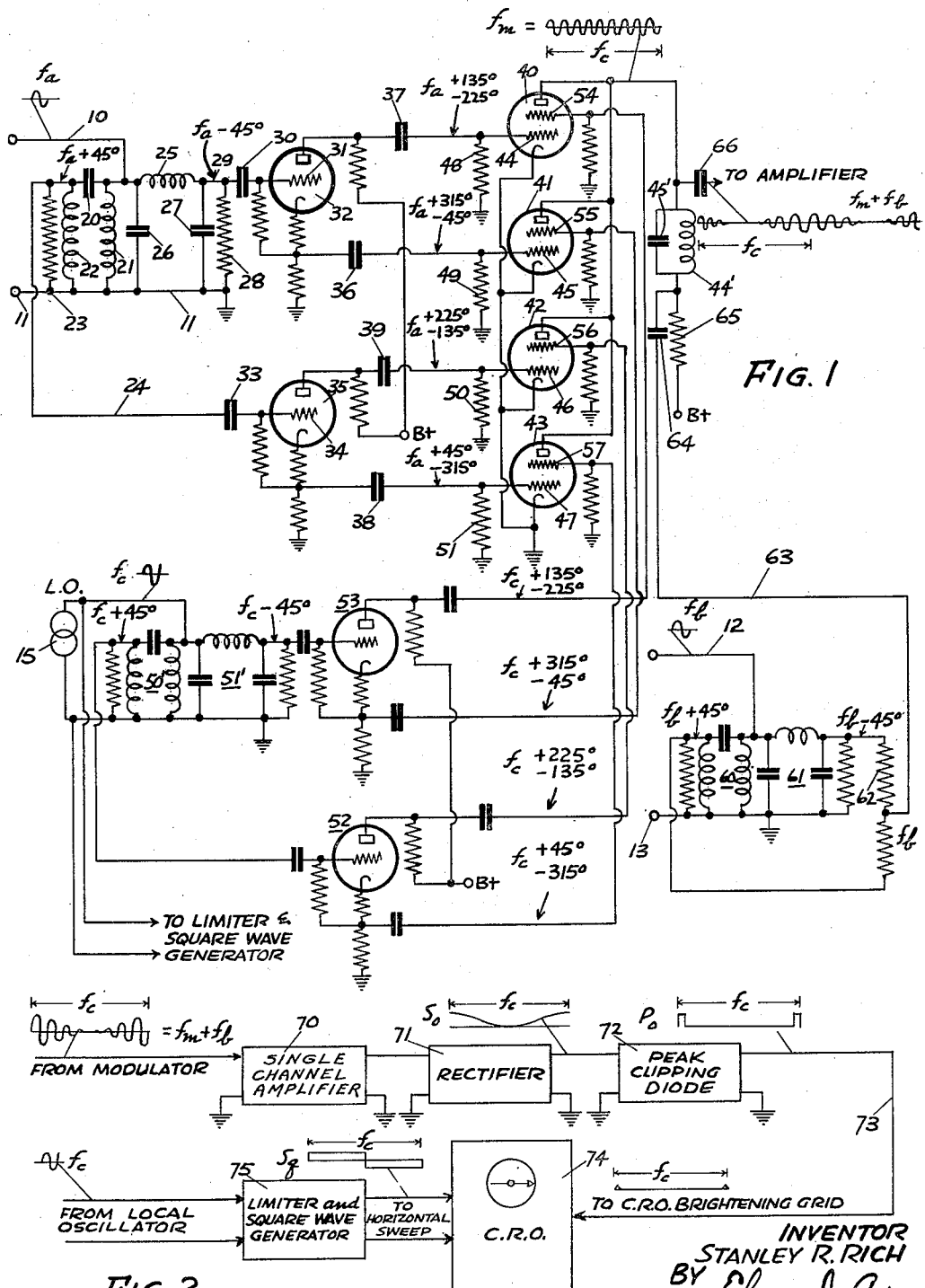

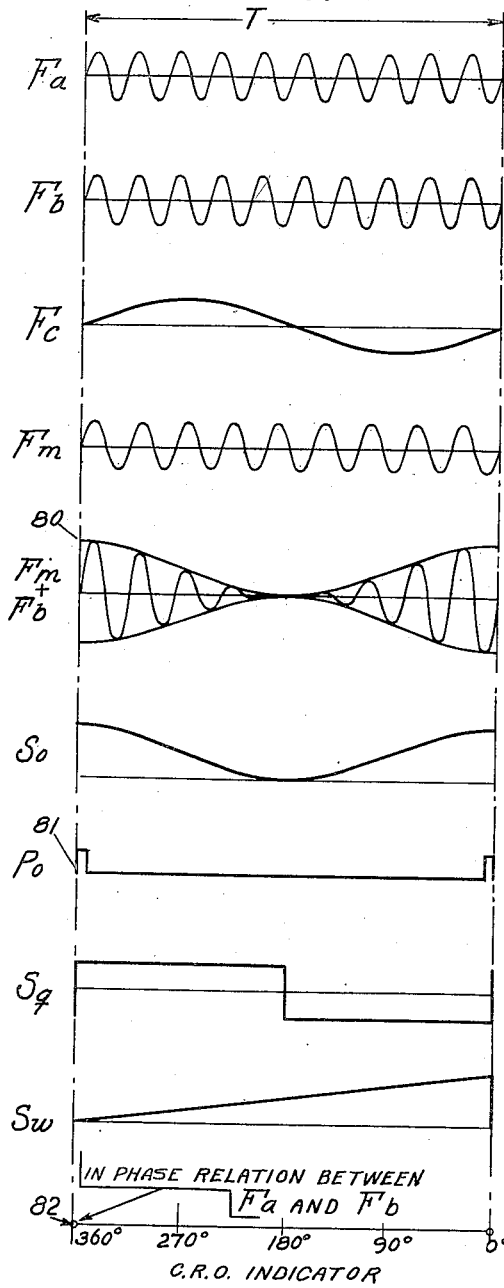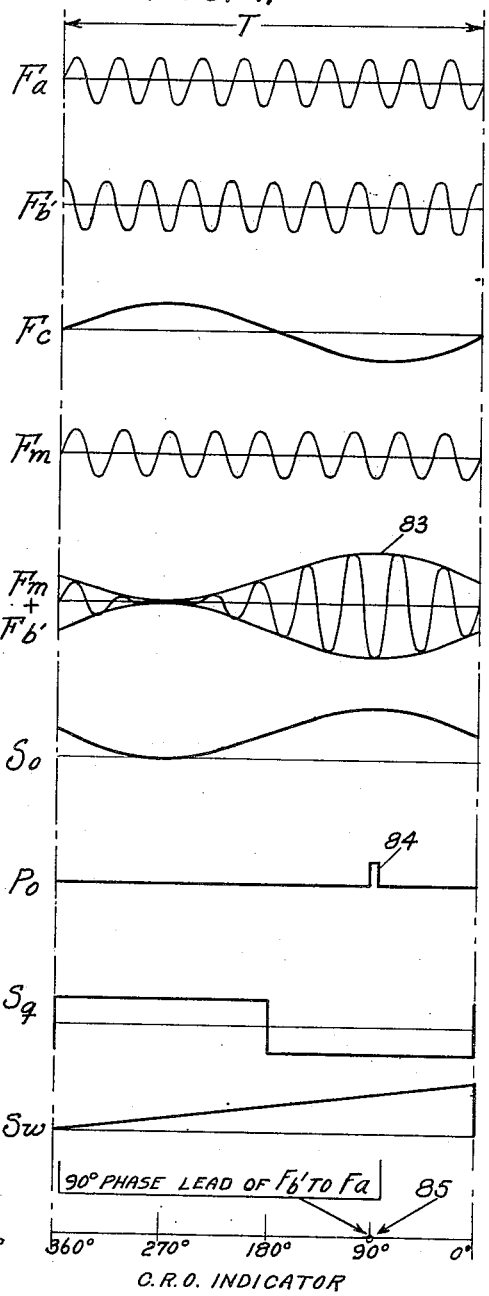

2,546,407

UNITED STATES PATENT OFFICE 2,546,407

ELECTRICAL SYSTEM FOR INDICATING RELATIVE PHASE DISPLACEMENT

Stanley R. Rich, Cambridge, Mass., assignor to Raytheon Manufacturing Company, a corporation of Delaware Application January 31, 1947, Serial No. 725,478

13 Claims. (Cl. 172—245)

This invention relates to electrical systems for indicating the instantaneous phase displacement between two periodically varying electrical quantities of the same frequency and methods of operating such systems.

One of the objects of the invention is to provide an improved system for indicating the phase displacements between two periodically varying electrical quantities of the same frequency, the overall components in the system being improved and simplified to assure accuracy of results with a minimum of interrelated factors to be correlated.

A disadvantage of previous phase indicating systems of the type to which this invention relates has been the requirement of a high gain amplifier for individually amplifying each of the periodically varying quantities whose phase relations are to be compared. As is well known, it is exceedingly difficult to construct high gain amplifiers with a minimum of phase shift between the input and output signals and it is practically impossible to maintain the same amount of phase shift in any two high gain amplifiers due to variations in the component parts of the amplifiers and their responses to varying conditions of applied voltages, temperatures, etc. Therefore, the accuracy of the result is not assured in a phase indicating system of the type employing two or more high gain amplifiers, each of which is intended to amplify one of the periodically varying quantities whose phase displacement is to be compared relative to another. Furthermore, such amplifiers may not be practically designed to amplify very high frequencies of periodically varying quantities whose phase relations are to be compared.

It is, therefore, another object of this invention to provide an improved electrical system for indicating the phase displacements between two periodically varying electrical quantities of the same periodic frequency, the system providing for the use of only one single channel amplifier designed to operate with a pass band width to encompass both of the frequencies containing the phase information and amplify them with equal amplitude.

The improved system of this invention also provides for a continuous and accurate indication of the relative phase displacements between two periodically varying electrical quantities of the same periodic frequency.

In the form of the system of this invention as herein described, a first periodically varying electrical quantity, whose phase is to be compared with a second periodically varying quantity of the same periodic frequency, is continuously rotated in phase to produce a new periodically varying quantity having a periodic frequency that is a mathematical function of the first frequency and the frequency of its phase rotation. This new electrical quantity or frequency thus obtained maintains a predetermined phase relation to the phase of the first frequency and to the phase of the phase rotation frequency. The new quantity is then combined with the second periodically varying electrical quantity whose phase is to be compared with the first quantity and since the second quantity is of the same frequency as the original first quantity, a beat frequency equal to the frequency of the phase rotation is obtained. As previously mentioned, the new periodically varying quantity maintains a predetermined phase relation to the first periodically varying electrical quantity and to the phase of the phase rotation frequency so that, when the new frequency is combined with the second periodically varying electrical quantity, the beat frequency thus produced will bear a phase relation to the phase rotation frequency that is the same or differing by only a fixed constant angle from the phase relation between the original two periodically varying electrical quantities. If the phase rotation frequency is selected to be a conveniently handled frequency, it is apparent that the new frequency and the frequency to be compared, containing all of the phase information, may be readily amplified by a single channel signal frequency amplifier having a band pass width sufficient to amplify both frequencies. The phase of the amplified beat frequency obtained upon detecting both frequencies passed by the amplifier may then be compared in any known manner with the phase of the phase rotation frequency after making suitable allowances for the phase shift in the amplifier which phase shift may be easily controlled in such amplifiers designed for single channel operation.

Therefore, it is also an object of this invention to provide an improved electrical method of indicating the relative phase displacement between two periodically varying electrical quantities of the same periodic frequency.

Further objects and advantages of this invention will be apparent upon reference to the following specification and accompanying drawings, in which:

Fig. 1 is a schematic wiring diagram embodying the continuous phase rotation and combining circuits of this invention for producing the beat frequency envelope containing all of the phase information relative to the phase difference between two periodically varying quantities $F_a$ and $F_b$ of the same frequency;

Fig. 2 is a block diagram of a system for indicating the phase displacement between the beat frequency envelope $F_m + F_b$ and the reference phase rotation frequency $F_c$;

Fig. 3 includes a series of graphs to show the various waveforms at indicated points in the system of the invention for a condition of in-phase relation between the two periodically varying quantities $F_a$ and $F_b$; and Fig. 4 is similar to Fig. 3 but shows the various waveforms for a condition of a 90° phase lead for the quantity $F_{b'}$ relative to quantity $F_a$.

Referring to Fig. 1 of the drawings, the periodically varying electrical quantity of a frequency $F_a$ is applied to input terminals 10 and 11 and the periodically varying electrical quantity of the same frequency $F_b$ is applied to the terminals 12 and 13. Frequencies $F_a$ and $F_b$ may not have the same phase relation and it is to indicate the phase displacement, if any, between frequencies $F_a$ and $F_b$ that the system of this invention has been devised. Periodically varying electrical quantities $F_a$, $F_b$, $F_m$ and $F_m + F_b$ will hereafter be synonymously referred to as frequencies. For purposes of this description the frequency $F_a$ has been selected to be the one that is continuously rotated in phase by a phase rotation frequency $F_c$ generated by the local oscillator 15. Local oscillator 15 may be of any suitable type of frequency generating device such as an alternating current generator or a vacuum tube oscillator. The frequency $F_a$ applied to terminals 10 and 11 is divided into a plurality of similar frequencies having predetermined different phase relations to each other. In one form of the invention, suitable for this purpose, a phase leading network comprised of a series condenser 20 and parallel inductors 21 and 22, together with the terminating load resistance 23, is connected to the input terminals 10 and 11 to provide at its output via wire 24 and terminal 11 the frequency $F_a$ leading by 45°. A phase lagging network comprised of the series inductor 25 and paralleled condensers 26 and 27, together with terminating load resistance 28, is also connected to the input terminals 10 and 11 to provide at its output terminals 29 and 11 the frequency $F_a$ lagging by 45°. The frequency $F_a$ minus 45° is coupled by condenser 30 to the control grid 31 of phase inverter tube 32 and the frequency $F_a$ plus 45° is coupled by the condenser 33 to the control grid 34 of phase inverter tube 35. Phase inverter tubes 32 and 35 are connected in conventional phase inverter circuits of the type in which the plate and cathode load resistances are equal so that a pair of phase opposition outputs of equal amplitude may be obtained at the plate and cathode of each phase inverter tube. As is well known with such phase inversion circuits, the signal output at the cathode follows the phase of the signal on control grid while the signal output at the plate is 180° shifted in phase relative to the phase of the control grid signal. Thus the signal frequency coupled by condenser 36 from the cathode of the inverter tube 32 is equivalent to the signal $F_a$ minus 45° while the signal coupled by the condenser 37 from the plate of phase inverter tube 32 is equivalent to the signal $F_a$ minus 225°. Similarly, the signal coupled by the condenser 38 from the cathode of phase inverter tube 35 is equivalent to the signal $F_a$ plus 45°, while the signal coupled by the condenser 39 from the plate of phase inverter tube 35 is equivalent to the signal $F_a$ plus 225°. In other words, with the specific form of the invention just described, the periodically varying quantity of a frequency $F_a$ is transformed into four similar frequencies having quadrature phase relations to each other. A description of the energizing voltages for the phase inverter tubes 32 and 35, together with their circuit elements, has been omitted for the sake of clarity since it is apparent that any of the well known circuit arrangements may be used for such purposes.

It will be apparent that when the four electrical quantities of the same frequency and having quadrature phase relations to each other as coupled through condensers 36, 37, 38 and 39 are progressively and periodically connected in the sequence of their phase relations to an output load, a new frequency $F_m$ will be obtained which will be a mathematical function of their original frequency and the frequency of their periodic progressive connections to the load. In other words, the phase of frequency $F_a$ will be progressively and continuously rotated to produce a new frequency $F_m$. Any suitable commutating means for periodically connecting in such manner the four quadrature phase electrical quantities of frequency $F_a$ to the output load may be used and the rotational speed of such a commutator would then be the phase rotation frequency. While the form of the invention being described discloses means for transforming the electrical quantity of the frequency $F_a$ into four electrical quantities of the same frequency but having quadrature phase relations to each other, it is obvious that the frequency $F_a$ may be transformed into any number of new quantities of the same frequency but of different phase relations to each other.

In the form of the invention being described, an electronic commutating system comprised of the mixing tubes 40, 41, 42 and 43 is provided. Each of the mixing tubes 40—43 is provided with two control grids and may also have other grid elements such as screen or suppressor grids (not shown), if desired. The plates of the mixer tubes 40—43 are connected together into an output load which may be an inductance 44' tuned by a condenser 45' to the new frequency $F_m$. The cathodes of tubes 40—43 are also connected together and may be grounded as shown or may be provided with a source of cathode bias depending upon the particular tube operation desired. The frequency $F_a$ minus 225° is coupled by condenser 37 from the plate of phase inverter tube 32 to the first control grid 44 of mixer tube 40 and the frequency $F_a$ minus 45° is coupled by condenser 36 from the cathode of phase inverter tube 32 to the first control grid 45 of mixer tube 41. Similarly, the frequency $F_a + 225°$ is coupled by condenser 39 from the plate of phase inverter tube 35 to the first control grid 46 of mixer tube 42, while the frequency $F_a + 45°$ is coupled by the condenser 38 from the cathode of phase inverter tube 35 to the first control grid 47 of mixer tube 43. Grid load resistors 48, 49, 50 and 51 complete the first control grid and cathode circuits for the mixer tubes 40—43, respectively. This invention contemplates means to progressively render more conductive one each of the tubes 40—43 in the order of the sequential phase relation of the signals applied to their first control grid and cathode circuits. This conductivity cycle must be continuous in order to provide for a continuous phase rotation of the frequency $F_a$ to produce the new frequency $F_m$. The resultant signal at the new frequency $F_m$ as obtained from such a system is therefore of constant amplitude which is, of course, preferable in order to avoid distortion of the beat frequency envelope to be obtained. The periodic frequency with which each of the tubes 40—43 is rendered more conductive relative to the others may be termed the phase rotation frequency and is obtained from the local oscillator 15 as previously mentioned.

The conductivities of the tubes 40—43 may be controlled in various ways and the use of auxiliary or second control grids provides a suitable means therefor. The output frequency $F_c$ from the local oscillator 15 is transformed into a plurality of signals of the same frequency and having predetermined phase relations to each other in the same manner as the frequency $F_a$ was transformed into four like frequencies having quadrature phase relations to each other. A phase leading network 50' and a phase lagging network 51' are connected, respectively, between the local oscillator output and the phase inverter tube circuits 52 and 53 to provide four phase inverter output signals of the frequency $F_c$ and having quadrature phase relations to each other. In order that the four phase inverter output frequencies $F_c$ having quadrature phase relations to each other may control the conductivities of mixer tubes 40—43 in the manner previously set forth, the frequency $F_c$ minus 225° must be connected to the second control grid and cathode circuit 54 of mixer tube 40. Similarly, the frequency $F_c$ minus 45° must be connected to the second control grid 55 of mixer tube 41, the signal $F_c+225°$ must be connected to the second control grid 56 of mixer tube 42 and the signal $F_c+45°$ must be connected to the second control grid 57 of mixer tube 43. If the four quadrature phase signals $F_c$ are now so connected to the mixer tubes 40—43 in that order, it will be apparent that the new frequency $F_m$ which is the mathematical function of the frequency $F_a$ and its phase rotation frequency $F_c$ may be of a different value. In other words, the new frequency $F_m$ will be equal to the old frequency $F_a$ plus or minus the phase rotation frequency $F_c$ depending upon the relative connections of the phase inverter quadrature output frequencies $F_c$ to the second control grid and cathode circuits of tubes 40—43. The mixer tubes 40—43 may be likened to a differential mechanism in that if the progressions of the signals on the first control grids are in one direction while the progressions of the signals on the second control grids are in the other direction the output frequency will be the result of the sum of the two frequencies. If, however, the progressions of the signals on both control grids of each of the mixer tubes 40—43 are in the same direction, as illustrated, the resultant frequency $F_m$ will be the difference between the two frequencies $F_a$ and $F_c$.

As previously pointed out, the new frequency $F_m$ bears a predetermined phase relation to the phase of frequency $F_a$ and the phase of the phase rotation of frequency $F_c$. The new frequency $F_m$ is then combined with frequency $F_b$ whose phase displacement relative to frequency $F_a$ is to be indicated, and a beat frequency envelope $F_m+F_b$ is obtained upon suitable detection. In the particular form of the invention being described the first frequency $F_a$ was split into two similar frequencies of different phase by a phase lagging and phase leading network. Such networks are discriminatory as to frequency so that for any frequency changes there will be changes in the phase shift applied to the two new frequencies. In order to preserve the phase relations throughout the system between frequencies $F_a$ and $F_b$ in view of such contingencies as a slight frequency shift for the frequencies $F_a$ and $F_b$, it is necessary to provide a substantially identical phase leading and lagging network 60 and 61, respectively, for the other frequency $F_b$. The output frequencies of the phase leading and lagging networks 60 and 61 are vectorially added by bridging across voltage divider 62 to produce an intermediate phase of frequency $F_b$ in the line 63, which intermediate phase will maintain the same phase displacements due to any shift in frequencies as would be produced in lines 24 and 29 with regard to the frequency $F_a$. The intermediate phase of frequency $F_b$ in line 63 is coupled by a condenser 64 to the output load comprising inductor 44' and condenser 45' in parallel, and may be combined with the new frequency $F_m$ by a load resistor 65 connected between the plate voltage supply and the output load. It should here be pointed out that the description of the energizing voltages and circuit elements used therefor in connection with the mixer tubes 40—43 has been omitted for the sake of clarity since conventional circuit arrangements may be used.

The periodically varying electrical quantities $F_m+F_b$ are coupled by condenser 66 to the input of single channel amplifier 70 shown in block outline in Fig. 2 of the drawings. The amplified signals $F_m+F_b$ appearing at the output of the amplifier 70 are rectified by a suitable detector 71 to obtain a beat frequency envelope of $F_m+F_b$ and the rectified output is applied to the peak clipping diode circuit shown in block outline at 72. Thus voltage pulses corresponding to the occurrence in time T of the amplitude peak of the rectified portion of the beat frequency envelope are obtained in line 73 and are connected to the brightening grid of a cathode ray oscilloscope 74. The local oscillator or generator 15, providing the phase rotation frequency $F_c$, is also connected to a voltage limiter and square wave generator shown in block outline at 75 of Fig. 2 and the output of the square wave generator is used to control the horizontal sweep of the cathode ray oscilloscope 74.

The relative phase indication system shown by the block outlines of Fig. 2 of the drawings is more or less conventional and will be clearly understood when analyzing the operation of the invention in connection with Figs. 3 and 4 of the drawings. In Fig. 3 the waveforms are those obtained for a condition of in-phase relation between frequencies $F_a$ and $F_b$. To facilitate the explanation, an arbitrary frequency of ten cycles in the time T has been selected for the frequencies $F_a$ and $F_b$ while the phase rotation frequency $F_c$ has been selected to have a frequency of one cycle in time T. When the phase rotation frequency $F_c$ is used in the manner shown in Fig. 1 of the drawings to periodically render more conductive one each of the mixer tubes 40—43 in the order of the sequential relation of the phase displacements of the signals applied to their first control grids, the new frequency $F_m$ will be equal to the frequency $F_a$ minus the frequency $F_c$ or, in other words, nine cycles in time T. When the frequency $F_m$ is combined with the frequency $F_b$ the vectorial addition results in a beat frequency envelope indicated by $F_m+F_b$, having a frequency equal to the phase rotation frequency $F_c$, and it will be noted that the amplitude peak 80 of the beat frequency envelope coincides with the initiation of the time T. When the two frequencies $F_m+F_b$ are rectified, the signal $S_o$ results, which when applied to a peak clipping diode results in the voltage pulses $P_o$ such as is shown at 81 coinciding with the occurrence of the amplitude peak at 80 at the beginning of time T. The phase rotation frequency $F_c$ is also applied to the limiter and square wave generator 75 to produce the square wave signal $S_q$ which when connected to the horizontal sweep of the cathode ray oscilloscope synchronizes the sweep voltage $S_w$ with the beginning of time T. Since the voltage pulse $P_o$ corresponding to the point of maximum amplitude for the beat frequency envelope also occurs at the beginning of time T and is applied to the brightening grid of the cathode ray oscilloscope, a dot of light 82 will be seen at the extreme right and left end of the cathode ray screen which indicates an in-phase relation or in other words that there is no phase displacement between frequencies $F_a$ and $F_b$.

In Fig. 4 of the drawings, however, a condition of 90° phase lead for frequency $F_{b'}$ relative to frequency $F_a$ shows that the occurrence of the maximum amplitude point of the beat frequency modulation envelope of $F_m+F_b$ will be displaced in phase 90° relative to the maximum amplitude point for the beat frequency envelope of $F_m+F_b$ of Fig. 3. In other words, the maximum amplitude point 83 for the beat frequency envelope of $F_m+F_{b'}$ of Fig. 4 will be leading the initiation time T by 270°. When rectified and clipped by the peak clipping diode a voltage pulse will be produced at 84 also leading the initiation of time T by 270° which when applied to the brightening grid of the cathode ray oscilloscope will cause an indication to be shown on the cathode scope at the position 85 corresponding to the lead of 270° relative to the start of time T. However, the screen of the oscilloscope may be calibrated directly in terms of phase displacement between frequencies $F_a$ and $F_{b'}$ and the position of the indication dot 85 may be calibrated directly as a 90° phase displacement. It is obvious that for other conditions of phase displacements between frequencies $F_a$ and $F_b$ the dot indication on the screen of the oscilloscope will assume corresponding positions indicative of such phase displacement.

It should be understood that this invention is not limited to the specific form of the system shown since various equivalent elemental units of the system will be apparent to those skilled in the art.

What is claimed is:

1. An electric system for indicating the phase displacement between first and second periodically varying electrical quantities comprising: means to continuously rotate the phase of the first of said quantities at a fixed frequency to produce a new periodically varying quantity; means to combine said new quantity with said second quantity to obtain a beat frequency envelope having said fixed frequency of said phase rotation whereby the phase relation between the frequency of said envelope and said phase rotation frequency is proportional to the phase relation between said first and second quantities; and means to indicate the phase relation between said envelope and said phase rotation frequency.

2. An electric system for indicating the phase displacement between first and second periodically varying electrical quantities comprising: means to continuously rotate the phase of the first of said quantities at a fixed frequency to produce a new periodically varying quantity; means to combine said new quantity with said second quantity to obtain a beat frequency envelope having said fixed frequency of said phase rotation whereby the phase relation between the frequency of said envelope and said phase rotation frequency is proportional to the phase relation between said first and second quantities; means to amplify said beat frequency envelope; and means to indicate the phase relation between said envelope and said phase rotation frequency.

3. An electric system for indicating the phase displacement between first and second periodically varying electrical quantities comprising: input terminals; an output load; means connected to said input terminals to transform the first-mentioned quantity applied to said terminals into a plurality of electrical quantities of the same frequency as said first-mentioned quantity and bearing predetermined sequential phase relations to each other; electronic mixer means; commutating means to periodically connect, with a frequency equal to a desired frequency of phase rotation for said first-mentioned quantity, each of said plurality of quantities to said mixer means and therethrough to the output load progressively in their sequence of phase relation to each other to thereby produce a new periodically varying electrical quantity in the output load; means to combine said new quantity with said second quantity to obtain a beat frequency envelope having the frequency of said phase rotation whereby the phase relation between said envelope and said phase rotation frequency is proportional to the phase relation between said first and second quantities; and means to indicate the phase relation between said envelope and said phase rotation frequency.

4. An electric system for indicating the phase displacement between first and second periodically varying electrical quantities comprising: input terminals; an output load; means connected to said input terminals to transform the first-mentioned quantity applied to said terminals into a plurality of electrical quantities of the same frequency as said first-mentioned quantity and bearing predetermined sequential phase relations to each other; electronic mixer means; commutating means to periodically connect, with a frequency equal to a desired frequency of phase rotation for said first-mentioned quantity, each of said plurality of quantities to said mixer means and therethrough to the output load progressively in their sequence of phase relation to each other to thereby produce a new periodically varying electrical quantity in the output load; means to combine said new quantity with said second quantity to obtain a beat frequency envelope having the frequency of said phase rotation whereby the phase relation between said envelope and said phase rotation frequency is proportional to the phase relation between said first and second quantities; means to amplify said beat frequency envelope; and means to indicate the phase relations between said envelope and said phase rotation frequency.

5. An electric system for indicating the phase displacement between first and second periodically varying electrical quantities comprising: input terminals; an output load; means connected to said input terminals to transform the first-mentioned quantity applied to said terminals into a plurality of electrical quantities of the same frequency as said first-mentioned quantity and bearing predetermined sequential phase relations to each other; a plurality of electron tubes equal in number to said plurality of quantities, each of said tubes including at least cathode, plate, and grid electrodes; means connecting the plates of said tubes to each other and to the output load; means connecting different ones each of said plurality of electrical quantities to the grid and cathode circuit of different ones each of said tubes; means to periodically, with a frequency equal to a desired frequency of phase rotation for said first-mentioned quantity, render more conductive one each of said tubes in the sequence of the phase relation of each of the quantities connected to the grid and cathode circuit of said tubes to thereby produce a new periodically varying electrical quantity in the output load circuit; means to combine said new quantity with said second quantity to obtain a beat frequency envelope having the frequency of said phase rotation whereby the phase relation between said envelope and said phase rotation frequency is proportional to the phase relation between said first and second quantities; and means to indicate the phase relation between said envelope and said phase rotation frequency.

6. An electric system for indicating the phase displacement between first and second periodically varying electrical quantities comprising: input terminals; an output load; means connected to said input terminals to transform the first-mentioned quantity applied to said terminals into a plurality of electrical quantities of the same frequency as said first-mentioned quantity and bearing predetermined sequential phase relations to each other; a plurality of electron tubes equal in number to said plurality of quantities, each of said tubes including at least cathode, plate, and first and second control grid electrodes; means connecting the plates of said tubes to each other and to the output load; means connecting different ones each of said plurality of electrical quantities to the first control grid and cathode circuit of different ones each of said tubes; means connected to the second control grid and cathode circuit of each of said tubes to periodically, with a frequency equal to a desired frequency of phase rotation for said first-mentioned quantity, render more conductive one each of said tubes in the sequence of the phase relation of each of the quantities connected to the first control grid and cathode circuit of said tubes to thereby produce a new periodically varying electrical quantity in the output load circuit; means to combine said new quantity with said second quantity to obtain a beat frequency envelope having the frequency of said phase rotation whereby the phase relation between said envelope and said phase rotation frequency is proportional to the phase relation between said first and second quantities; and means to indicate the phase relation between said envelope and said phase rotation frequency.

7. An electric system for indicating the phase displacement between first and second periodically varying electrical quantities comprising: input terminals; an output load; means connected to said input terminals to transform the first-mentioned quantity applied to said terminals into four electrical quantities of the same frequency as said first-mentioned quantity and bearing quadrature sequential phase relations to each other; commutating means to periodically connect, with a frequency equal to a desired frequency of phase rotation for said first-mentioned quantity, each of said four quantities to the output load progressively in their sequence of phase relation to each other to thereby produce a new periodically varying electrical quantity in the output load; means to combine said new quantity with said second quantity to obtain a beat frequency envelope having the frequency of said phase rotation whereby the phase relation between said envelope and said phase rotation frequency is proportional to the phase relation between said first and second quantities; and means to indicate the phase relation between said envelope and said phase rotation frequency.

8. An electric system for indicating the phase displacement between first and second periodically varying electrical quantities comprising: input terminals; an output load; means to apply the first-mentioned quantity to said input terminals; a phase lagging network connected to said input terminals; a phase leading network connected to said input terminals; a phase inverter circuit connected to the output of said lagging network; a phase inverter circuit connected to the output of said leading network; means connected to the two phase opposition outputs of each of said phase inverter circuits to provide four electrical quantities of the same frequency as said first-mentioned quantity and bearing predetermined sequential phase relations to each other; electronic mixer means; commutating means to periodically connect each of said four quantities to said mixer means and therethrough to the output load progressively in their sequence of phase relation to each other to thereby produce a new periodically varying electrical quantity in the output load; means to combine said new quantity with said second quantity to obtain a beat frequency envelope having the frequency of said phase rotation whereby the phase relation between said envelope and said phase rotation frequency is proportional to the phase relation between said first and second quantities; and means to indicate the phase relation between said envelope and said phase rotation frequency.

9. An electric system for indicating the phase displacement between first and second periodically varying electrical quantities comprising: input terminals, an output load; means connected to said input terminals to transform the first-mentioned quantity applied to said terminals into a first plurality of electrical quantities of the same frequency as said first-mentioned quantity and bearing predetermined sequential phase relations to each other; a plurality of electron tubes equal in number to said first plurality of quantities, each of said tubes including at least cathode, plate, and grid electrodes; means connecting the plates of said tubes to each other and to the output load; means connecting different ones each of said first plurality of electrical quantities to the grid and cathode circuit of different ones each of said tubes; a local oscillator having a frequency output equal to a desired frequency of phase rotation for said first-mentioned quantity; means to transform the output of said oscillator into a second plurality of quantities of the same frequency as the oscillator output and bearing the same number and predetermined sequential phase relations to each other as said first plurality of quantities; means connecting different ones each of the second group of quantities to different ones each of said tubes to control their conductivities to periodically render more conductive one each of said tubes in the sequence of the phase relation of each of the quantities connected to the grid and cathode circuit of said tubes to thereby produce a new periodically varying electrical quantity in the output load circuit; means to combine said new quantity with said second quantity to obtain a beat frequency envelope having the frequency of said phase rotation whereby the phase relation between said envelope and said phase rotation frequency is proportional to the phase relation between said first and second electrical quantities; and means to indicate the phase relation between said envelope and said phase rotation frequency.

10. An electric system for indicating the phase displacement between first and second periodically varying electrical quantities comprising: input terminals; an output load; means connected to said input terminals to transform the first-mentioned quantity applied to said terminals into a plurality of electrical quantities of the same frequency as said first-mentioned quantity and bearing predetermined sequential phase relations to each other; a plurality of electron tubes equal in number to said plurality of quantities, each of said tubes including at least cathode, plate, and first and second control grid electrodes; means connecting the plates of said tubes to each other and to the output load; means connecting different ones each of said first plurality of electrical quantities to the first control grid and cathode circuit of different one each of said tubes; a local oscillator having a frequency output equal to a desired frequency of phase rotation for said first-mentioned quantity; means to transform the output of said oscillator into a second plurality of electrical quantities of the same frequency as the oscillator output and bearing the same number and predetermined sequential phase relations to each other as the predetermined sequential phase relations of said first plurality of quantities; means connecting different ones each of the second plurality of quantities to the second control grid and cathode circuit of each of said tubes to periodically render more conductive one each of said tubes in the sequence of the phase relation of each of the quantities connected to the first control grid and cathode circuit of said tubes to thereby produce a new periodically varying electrical quantity in the output load circuit; means to combine said new quantity with said second quantity to obtain a beat frequency envelope having the frequency of said phase rotation whereby the phase relation between said envelope and said phase rotation frequency is proportional to the phase relation between said first and second electrical quantities; and means to indicate the phase relation between said envelope and said phase rotation frequency.

11. An electric system for indicating the phase displacement between first and second periodically varying electrical quantities comprising: input terminals; an output load; means to apply the first-mentioned periodically varying electrical quantity to said input terminals; a first phase lagging network connected to said input terminals; a first phase leading network connected to said input terminals; a phase inverter circuit connected to the output of said first lagging network; a phase inverter circuit connected to the output of said first leading network; means connected to the two phase opposition outputs of each of said phase inverter circuits to provide four electrical quantities of the same frequency as said first-mentioned quantity and bearing predetermined sequential phase relations to each other; electronic mixer means; commutating means to periodically connect, with a frequency equal to a desired frequency of phase rotation for said first-mentioned quantity, each of said plurality of quantities to said mixer means and therethrough to the output load progressively in their sequence of phase relation to each other to thereby produce a new periodically varying electrical quantity in the output load; means connecting said second quantity to a second phase lagging network; means connecting said second quantity to a second phase leading network, said second phase lagging and leading networks having substantially identical characteristics to said first phase lagging and leading networks; means to combine the outputs of said second phase lagging and leading networks in opposition to produce an intermediate phase quantity of the same frequency as said second quantity; and means to combine said new quantity with said intermediate quantity to obtain a beat frequency envelope having the frequency of said phase rotation whereby the phase relation between said envelope and said phase rotation frequency is proportional to the phase relation between said first and second electrical quantities; and means to indicate the phase relation between said envelope and said phase rotation frequency.

12. An electric system for indicating the phase displacement between first and second periodically varying electrical quantities comprising: means to continuously rotate the phase of the first of said quantities at a fixed frequency to produce a new periodically varying quantity of constant amplitude; means to combine said new quantity with said second quantity to obtain a beat frequency envelope having said fixed frequency of said phase rotation whereby the phase relation between said envelope and said phase rotation frequency is proportional to the phase relation between said first and second quantities; and means to indicate the phase relation between said envelope and said phase rotation frequency.

13. A device for indicating the phase displacement between two different electrical oscillations of the same frequencies which comprises a local oscillator of a substantially lower frequency; means for phase modulating one of said two electrical oscillations with the local oscillator signal to produce a sum and difference frequency; means combining one of the latter with the second of said electrical oscillations of the same frequency to produce a beat frequency; and means to compare the rectified envelope of the beat signal with said local oscillator signal to establish the phase difference between said two different electrical oscillations.

STANLEY R. RICH.

REFERENCES CITED

The following references are of record in the file of this patent:

UNITED STATES PATENTS

| Number | Name | Date |
|---|---|---|
| 1,719,052 | Green | July 2, 1929 |
| 2,130,172 | Armstrong | Sept. 13, 1938 |
| 2,220,201 | Bliss | Nov. 5, 1940 |
| 2,411,876 | Hansen | Dec. 3, 1946 |
| 2,411,916 | Woodyard | Dec. 3, 1946 |
| 2,416,310 | Hansen et al. | Feb. 25, 1947 |